(12) United States Patent
Dandurand

(10) Patent No.: US 7,618,102 B2
(45) Date of Patent: Nov. 17, 2009

(54) MULTI-EDGE TRACTION LUG TRACK

(75) Inventor: Jules Dandurand, Sherbrooke (CA)

(73) Assignee: Camoplast Inc., Sherbrooke Quebec (CA)

( * ) Notice: Subject to any disclaimer, the term of this patent is extended or adjusted under 35 U.S.C. 154(b) by 127 days.

(21) Appl. No.: 11/363,609

(22) Filed: Feb. 28, 2006

(65) Prior Publication Data

US 2006/0238027 A1    Oct. 26, 2006

(30) Foreign Application Priority Data

Apr. 26, 2005   (CA) .................................. 2505307

(51) Int. Cl.
B62D 55/00 (2006.01)
B62D 55/275 (2006.01)

(52) U.S. Cl. ...................... 305/165; 305/178

(58) Field of Classification Search ......... 305/165–167, 305/168–170, 178, 191
See application file for complete search history.

(56) References Cited

U.S. PATENT DOCUMENTS

| | | |
|---|---|---|
| 3,704,918 A | 12/1972 | Perreault |
| 5,709,440 A | 1/1998 | Lecours |
| 5,713,645 A | 2/1998 | Thompson et al. |
| 5,730,510 A | 3/1998 | Courtemanche |
| 6,109,705 A | 8/2000 | Courtemanche |
| 6,203,125 B1 * | 3/2001 | Arakawa et al. ............ 305/166 |
| 6,609,771 B2 * | 8/2003 | Morin et al. ................. 305/178 |
| 6,626,258 B1 * | 9/2003 | Forbes ......................... 180/184 |
| 6,935,708 B2 * | 8/2005 | Courtemanche ............ 305/165 |
| 7,018,005 B2 * | 3/2006 | Lemieux ...................... 305/178 |
| 7,048,344 B2 * | 5/2006 | Courtemanche ............ 305/165 |
| 2004/0217648 A1 * | 11/2004 | Rasmussen et al. ......... 305/165 |
| 2007/0063584 A1 * | 3/2007 | St-Pierre ..................... 305/169 |

FOREIGN PATENT DOCUMENTS

| | | |
|---|---|---|
| CA | 2143262 | 8/1996 |
| CA | 2143802 | 8/1996 |
| CA | 2182845 | 12/1997 |
| CA | 2273642 | 12/1999 |
| CA | 2319937 | 3/2002 |
| CA | 2332224 | 7/2002 |
| CA | 2337466 | 8/2002 |
| CA | 2412076 | 5/2004 |
| EP | 0 515 683 | 5/1998 |
| EP | 1 291 270 | 3/2003 |
| EP | 1 449 750 | 8/2004 |
| JP | 54126339 A * | 10/1979 ................. 305/168 |

* cited by examiner

Primary Examiner—Jason R Bellinger
(74) Attorney, Agent, or Firm—Patterson, Thuente, Skaar & Christensen, P.A.

(57) ABSTRACT

Treads for a track having at least one face, front or rear, that is uneven due to the presence of steps, indentations, or projections for example, thus providing a multi-edge ground contacting surface. The treads may further have an increasing cross section from a top part thereof to a bottom part thereof, the top pan having a section smaller than the bottom part.

27 Claims, 7 Drawing Sheets

MULTI-EDGE TRACTION LUG TRACK

CROSS REFERENCE TO RELATED APPLICATIONS

This application claims priority from Canadian patent application no. 2,505,307, filed on Apr. 26 2005, the disclosure of which is herein incorporated by reference.

FIELD OF THE INVENTION

The present invention relates to rubber tracks. More specifically, the present invention is concerned with a multi-edge traction lug track.

BACKGROUND OF THE INVENTION

A propulsion system generally found on tracked vehicles such as snowmobiles consists of a pair of longitudinally spaced apart wheel structures arranged on opposite sides of the vehicle chassis, which is driven by a pair of endless, substantially inextensible belts, each having an inner surface and a ground-engaging surface.

The inner surface is provided with a series of longitudinally spaced members, which guide the track relative to driving and tracking wheels forming part of the wheel structures. The ground-engaging surface of the belt is formed of a plurality of longitudinally spaced tread members that provide traction to the vehicle when traveling on various ground conditions. The ground-engaging surface of the track may comprise a series of integral profiles having various configurations to provide traction to the snowmobile.

Therefore, a track is usually formed of a body of elastomeric material, the ground-engaging surface thereof displaying a series of transverse profiles that provide traction for the snowmobile as it travels over a surface, while the inner surface of the track displays a series of integral lugs, which are contacted by sprocket wheels that drive the snowmobile track in rotation.

In spite of a number of developments in the field of tracks, there is still a need in the art for a track allowing efficient traction of a tracked vehicle over a range of surface conditions, while reducing noise generation.

SUMMARY OF THE INVENTION

More specifically, there is provided an endless track belt having an inner surface face and a ground-engaging surface, which, as it passes along a lower run of the belt, engages a surface to be traversed, the ground-engaging surface comprising a series of transversally extending treads, wherein at least one of: i) a front face and ii) a rear face of the treads is uneven.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

In the appended drawings:

FIG. 1 show a cross section of a tread according to an embodiment of the present invention, when unfolded, in absence of traction of the ground (FIG. 1A); and when folded, during traction on the ground (FIG. 1B);

FIG. 2 show embodiments of treads having one face presenting indentations (FIG. 2A) or projections (FIGS. 2B, 2C and 2D) and embodiments of treads having both faces presenting indentations (FIG. 2E) or projections (FIGS. 2F, 2G and 2H);

FIG. 3 is a cross section of a track according to an embodiment of the present invention.

DESCRIPTION OF EMBODIMENTS OF THE INVENTION

A tracked vehicle typically comprises an endless drive belt trained around drive sprockets or wheels (not shown) for driving the belt in an endless path. As illustrated in the FIGS. 1-4, the belt has an inner surface face 12 and a ground-engaging surface 14, which, as it passes along a lower run of the belt, engages a surface (not shown) to be traversed.

The inner track surface 12 is typically provided with spaced drive lugs 16, as shown in FIG. 3, which are spaced along the length of the inside of the belt for engaging the drive wheels (not shown) as is well known in the art.

The ground-engaging surface 14 typically comprises a series of transversally extending treads 18 extending generally from a center of the ground-engaging surface 14 to lateral edges thereof.

The treads 18 may be made of a rubber material. The endless belt may be made of flexible rubber or flexible rubber reinforced by rods (not seen) to strengthen the track, as is well known in the art. Typically, conventional tracks include, embedded in the rubber material of the body of the belt and in the region of the treads 18, such reinforcing rods, either metallic or plastic, to provide transverse rigidity to the track. Moreover, the track may comprise longitudinal perforated bands (not shown) supporting steal fasteners, as known in the art.

Figure 1A:
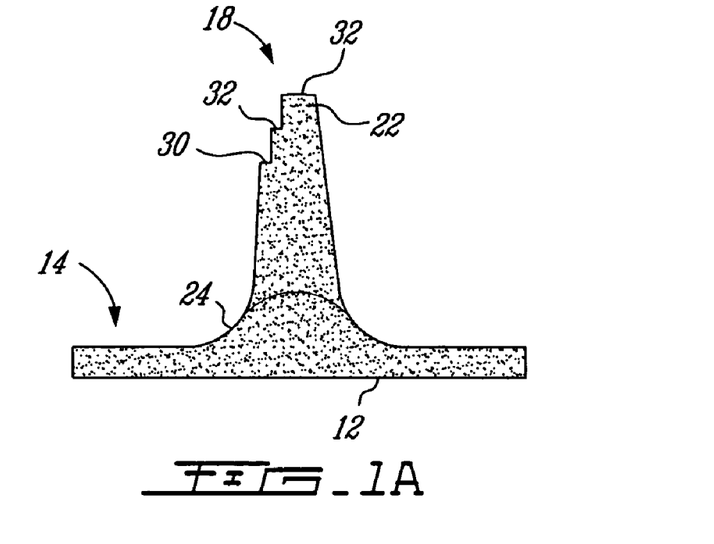
Figure 1B:
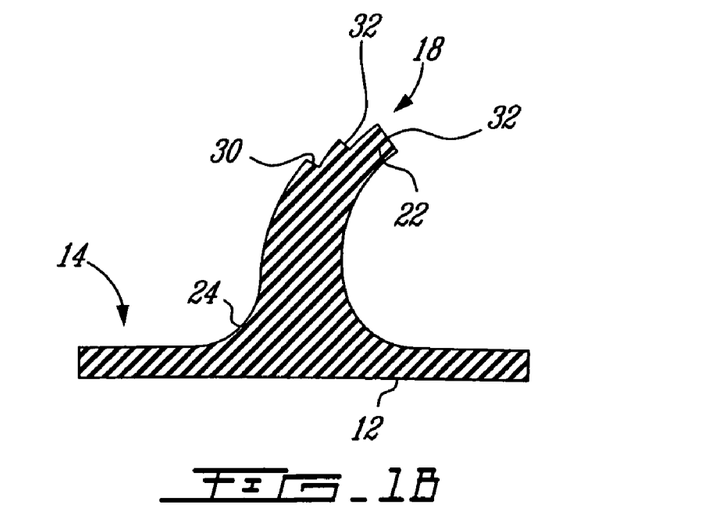
Figure 2A:
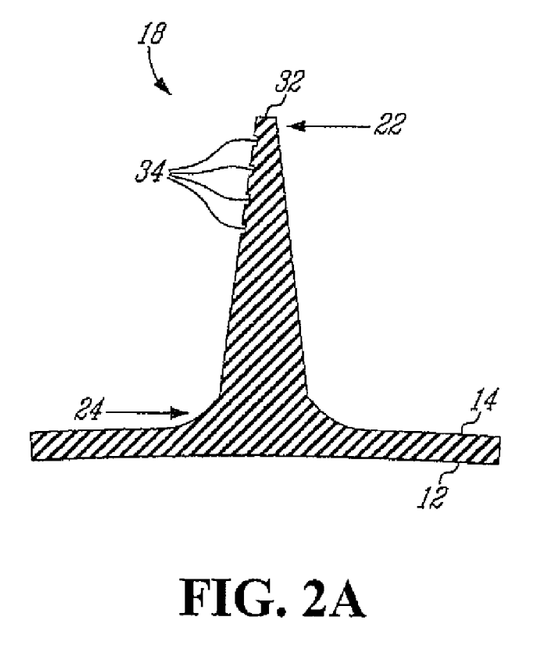
Figure 2B:
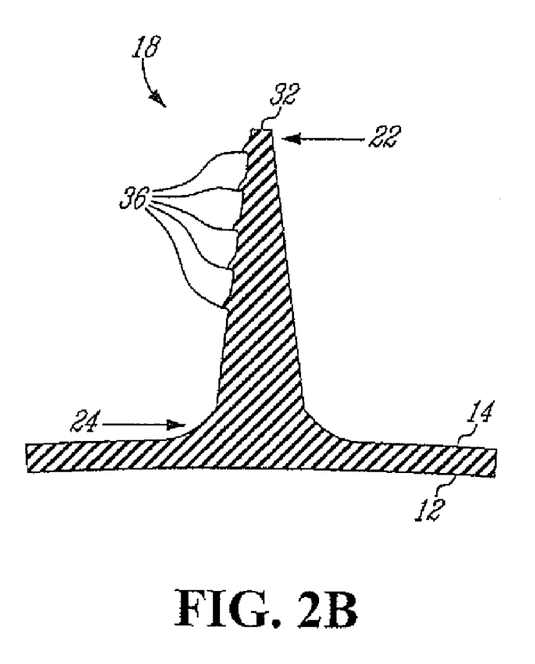
Figure 2C:
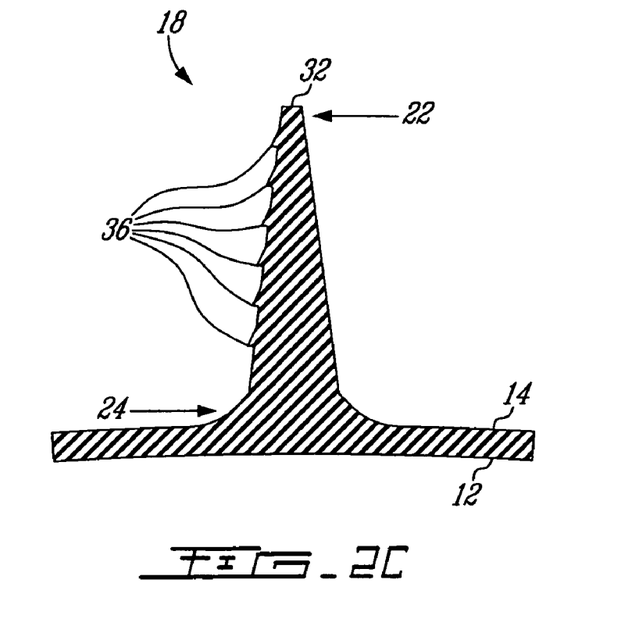
Figure 2D:
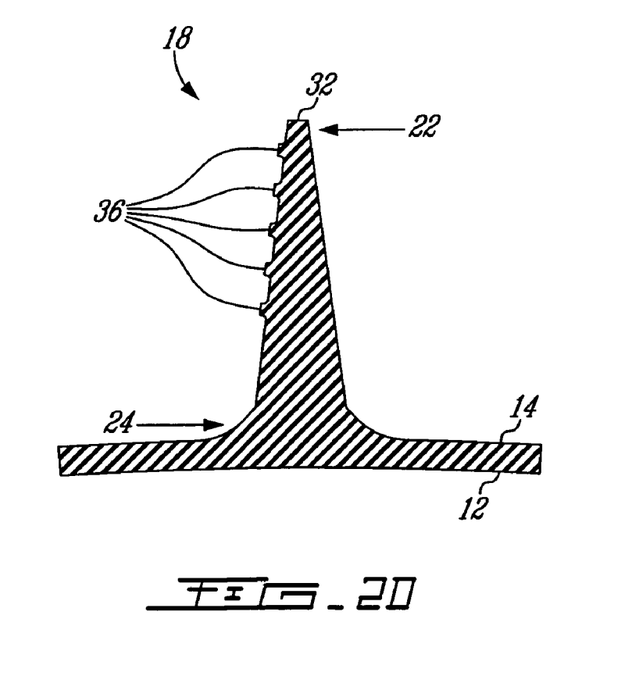
Figure 2E:
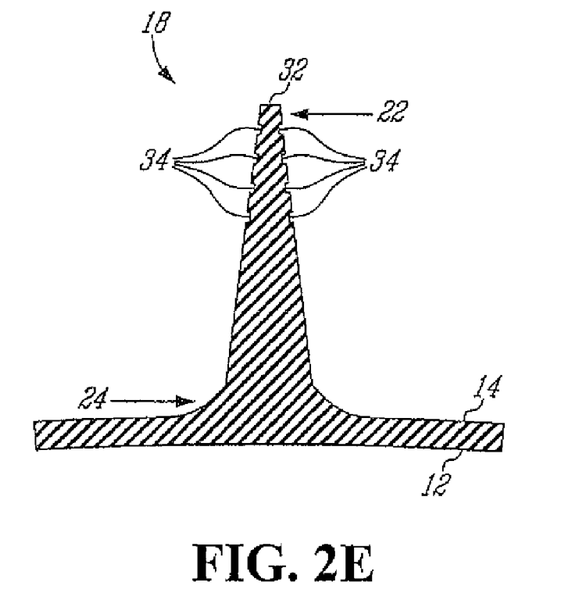
Figure 2F:
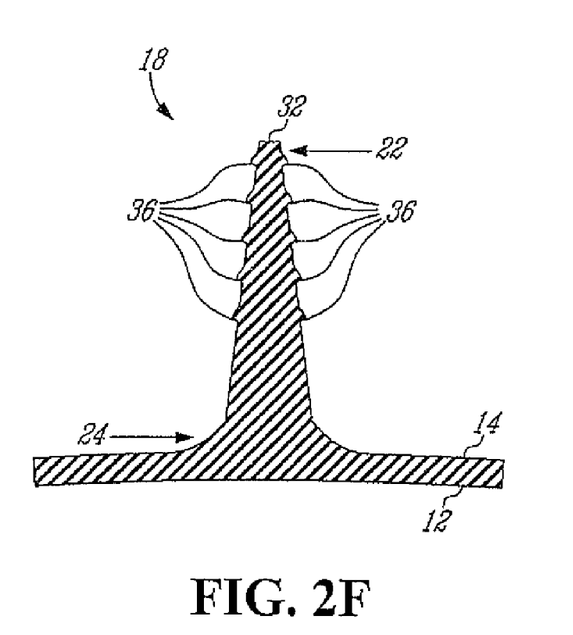
Figure 2G:
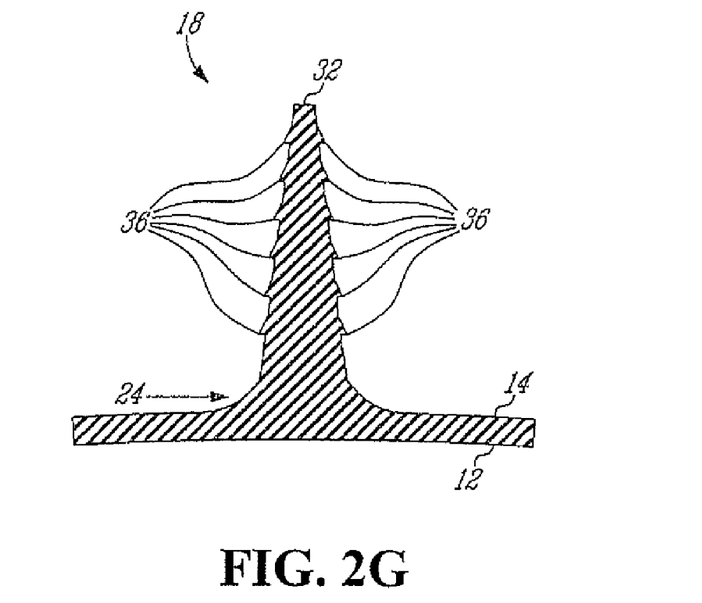
Figure 2H:
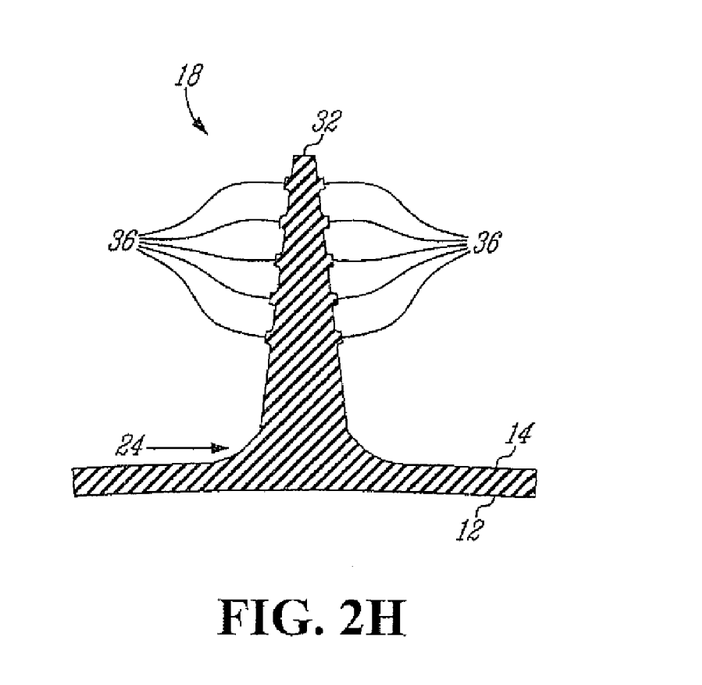
Figure 4:
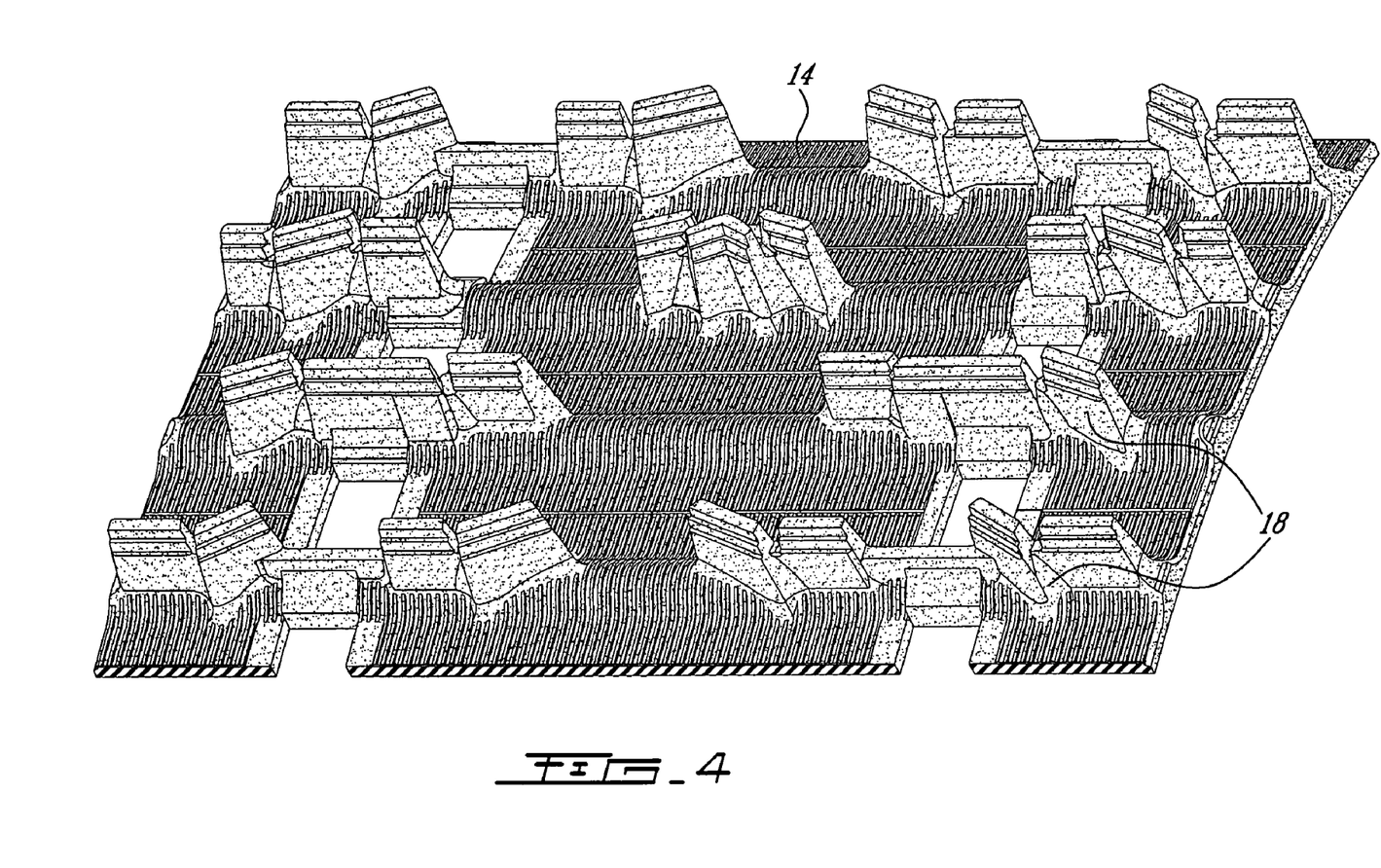
FIG. 4 is a top perspective view of the track of FIG. 3.
Figure 7:
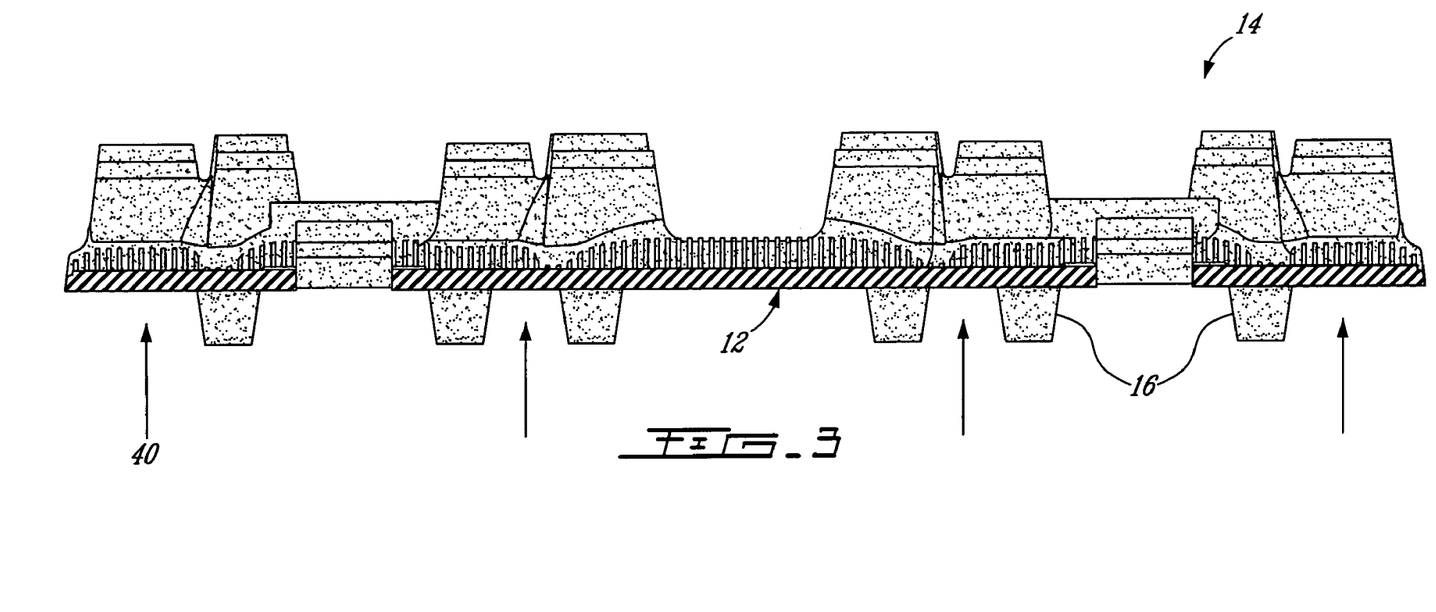

As illustrated in FIGS. 1 and 2, the face of the treads 18 is uneven, either in a step like manner (FIGS. 1A, 1B) or by presenting indentations 34 (FIG. 2A) or projections 36 (FIGS. 2B, 2C, 2D). These formations may be provided on the front face or/and on the rear of the treads 18 in a continuous or discontinuous way. These formations, either on the front face, i.e. facing frontward in relation to the vehicle, or on the rear face, i.e. on the face facing backwards, or both (FIGS. 2E to 2H), provide an increased number of ground engaging surfaces.

Furthermore, the treads have a non-uniform cross-section, from a top part 22 thereof to a bottom part 24 thereof, an outer edge 32 of the top part 22 being generally flat. The top part 22 has a section smaller than the bottom part thereof 24, the bottom part 24 thus being more massive and rigid.

In FIGS. 1A and 1B, the cross-section of a face of the treads 18 decreases in width by steps 30 and 32, the steps 30 and 32 providing formations on the face of the treads 18.

During traction, as the top parts 22 of the treads 18 tend to bend, as illustrated in FIG. 1B, uneven front faces of the treads 18 provides a number of surfaces of contact with the ground as the tread bends, the bottom parts 24 further achieving a grabbing action, thereby enhancing traction, especially during acceleration, for example. Uneven rear faces of the treads 18 provide a number of surfaces of contact with the ground as the tread bends during braking, thereby improving braking.

Uneven faces of the treads 18 therefore allow an increased driving control and stability.

It is further found that such a cross section, providing tread of reduced height in regions 40 of the track where idle wheels pass as shown in FIG. 3, further results in a reduction of noise generation.

Such a track may be used for recreational vehicles, snowmobiles or ATV for example.

Although the present invention has been described hereinabove by way of embodiments thereof, it may be modified, without departing from the nature and teachings of the subject invention as defined in the appended claims.

What is claimed is:

1. An endless track for a recreational vehicle, said endless track comprising:
    an inner side for engaging at least one driving wheel of the recreational vehicle to move said endless track to propel the recreational vehicle on the ground; and
    a ground-engaging outer side for engaging the ground, said ground-engaging outer side comprising a plurality of treads distributed longitudinally along said endless track for traction of the recreational vehicle on the ground, each tread comprising:
        a bottom part;
        a top part spaced from said bottom part; and
        an uneven face between said top part and said bottom part, said uneven face including a plurality of formations that extend transversally along said uneven face, wherein, when said tread engages the ground as the recreational vehicle moves on the ground, said top part bends relative to said bottom part such that at least some of said formations face and engage the ground, extend transversally to a direction of motion of the recreational vehicle and are spaced from one another along the direction of motion of the recreational vehicle to enhance traction of said endless track on the ground.

2. An endless track as claimed in claim 1, wherein said series plurality of formations comprises a plurality of steps.

3. An endless track as claimed in claim 2, wherein said plurality of steps includes at least three steps.

4. An endless track as claimed in claim 1, wherein said plurality of formations comprises a plurality of projections.

5. An endless track as claimed in claim 4, wherein said plurality of projections comprises at least three projections.

6. An endless track as claimed in claim 1, wherein said plurality of formations comprises a plurality of indentations.

7. An endless track as claimed in claim 6, wherein said plurality of indentations comprises at least three indentations.

8. An endless track as claimed in claim 1, wherein said uneven face is a front face facing frontward of the recreational vehicle.

9. An endless track as claimed in claim 1, wherein said uneven face is a rear face facing rearward of the recreational vehicle.

10. An endless track as claimed in claim 8, wherein said plurality of formations is a first plurality of formations of said tread, said tread comprising an uneven rear face between said top part and said bottom part, said uneven rear face including a second plurality of formations that extend transversally along said uneven face to enhance braking of the recreational vehicle.

11. An endless track as claimed in claim 1, wherein said top part of said tread has a cross-section that is smaller than a cross-section of said bottom part of said tread such that said tread tapers from said bottom part to said top part.

12. An endless track as claimed in claim 1, wherein said inner side comprises a plurality of drive lugs for engaging the at least one driving wheel of the recreational vehicle.

13. An endless track as claimed in claim 1, wherein said treads are distributed from a center portion of said ground-engaging outer side to lateral edge portions of said ground-engaging outer side.

14. An endless track as claimed in claim 1, wherein different ones of said treads are positioned at different angles relative to a widthwise axis of said endless track.

15. A recreational vehicle comprising an endless track as claimed in claim 1.

16. A recreational vehicle as claimed in claim 15, wherein said recreational vehicle is a snowmobile.

17. A recreational vehicle as claimed in claim 15, wherein said recreational vehicle is an all-terrain vehicle.

18. An endless track for a snowmobile, the endless track defining a ground-engaging run that is generally parallel to the ground when the snowmobile rides on the ground, the ground-engaging run laying in an imaginary horizontal reference plane and having a longitudinal axis and a transverse axis, the ground-engaging run being driven in a direction that is generally parallel to the longitudinal axis by an engine of the snowmobile to cause movement of the snowmobile on the ground, the ground-engaging run comprising a ground-engaging outer side for engaging the ground, said ground-engaging outer side having a tread pattern, the tread pattern including a plurality of treads projecting outwardly from the ground-engaging outer side, each tread having:
    a bottom portion;
    a top portion spaced from the bottom portion;
    a pair of main faces generally opposite to one another extending between the top portion and the bottom portion;
    wherein the tread has a thickness profile such that, under the weight of the snowmobile and traction efforts applied by the engine of the snowmobile, a region of the tread adjacent the top portion is induced to bend in a longitudinal direction to a greater extent than a region of the tread adjacent the bottom portion, whereby the tread acquires a curved configuration in which part of a first one of the main faces adjacent the top portion is oriented to face and engage the ground;
    wherein the part of the first one of the main faces adjacent the top portion has a surface pattern to enhance traction of the first one of the main faces, the surface pattern including a plurality of elongated relief components running in a direction that is substantially different from the longitudinal direction such that engagement of the surface pattern with the ground results into the elongated relief components extending generally crosswise to a direction of movement of the snowmobile.

19. An endless track as claimed in claim 18, wherein the plurality of elongated relief components comprise a plurality of projections.

20. An endless track as claimed in claim 18, wherein the plurality of elongated relief components comprise a plurality of indentations.

21. An endless track as claimed in claim 18, wherein the plurality of elongated relief components define a step-like structure.

22. An endless track as claimed in claim 18, wherein the tread tapers from the bottom portion to the top portion.

23. An endless track as claimed in claim 18, wherein the first one of the main faces is a front face.

24. An endless track as claimed in claim 18, wherein the first one of the main faces is a rear face.

25. An endless track as claimed in claim 18, wherein a second one of the main faces includes a surface pattern including a plurality of elongated relief components running crosswise to the direction of movement of the snowmobile.

26. A snowmobile comprising an endless track as claimed in claim 18.

27. A method for enhancing traction of a snowmobile on the ground, said method comprising:

using an engine of the snowmobile to move the snowmobile on the ground, the snowmobile comprising an endless track defining a ground-engaging run that is generally parallel to the ground and that comprises a ground-engaging outer side for engaging the ground, the ground-engaging outer side having a tread pattern that includes a plurality of treads projecting outwardly from the ground-engaging outer side, each tread having:

a bottom portion;

a top portion spaced from the bottom portion; and a pair of main faces generally opposite to one another extending between the top portion and the bottom portion; and inducing the treads of the ground-engaging run to bend in a longitudinal direction under the weight of the snowmobile and the movement of the snowmobile on the ground, each tread that is bent having a curved configuration in which part of a given one of its main faces adjacent its top portion is oriented to face and engage the wound and has a surface pattern to enhance traction of the given one of its main faces, the surface pattern including a plurality of elongated relief components running in a direction that is substantially different from the longitudinal direction such that engagement of the surface pattern with the ground results into the elongated relief components extending generally crosswise to a direction of movement of the snowmobile.

* * * * *